United States Patent [19]

Yamaguchi

[11] Patent Number: 5,780,577
[45] Date of Patent: Jul. 14, 1998

[54] POLYAMIDE RESIN COMPOSITION

[75] Inventor: Yutaka Yamaguchi, Yamaguchi, Japan

[73] Assignee: Ube Industries, Ltd., Yamaguchi, Japan

[21] Appl. No.: 743,448

[22] Filed: Nov. 1, 1996

[30] Foreign Application Priority Data

Nov. 2, 1995 [JP] Japan ................................. 7-285698
Sep. 5, 1996 [JP] Japan ................................. 8-234877

[51] Int. Cl.$^6$ ..................... C08G 69/08; C08G 73/10; C08L 77/00
[52] U.S. Cl. ..................... 528/310; 528/322; 528/332; 528/335; 524/600; 524/606; 428/474.5; 428/476.3
[58] Field of Search ................... 528/310, 322, 528/335, 332; 428/474.5, 476.3; 524/600, 606

[56] References Cited

U.S. PATENT DOCUMENTS

| | | | |
|---|---|---|---|
| 4,623,587 | 11/1986 | Ito et al. | 428/335 |
| 4,792,484 | 12/1988 | Moritani | 428/323 |
| 5,068,077 | 11/1991 | Negi et al. | 264/512 |
| 5,194,474 | 3/1993 | Aoyama et al. | 524/300 |
| 5,344,715 | 9/1994 | Negi et al. | 428/520 |
| 5,595,623 | 1/1997 | Lulham et al. | 156/244.14 |

FOREIGN PATENT DOCUMENTS

| | | |
|---|---|---|
| 0 258 040 A1 | 3/1988 | European Pat. Off. |
| 0 258 506 A1 | 3/1988 | European Pat. Off. |
| 0 469 693 A2 | 2/1992 | European Pat. Off. |
| 7-015059 B2 | 2/1995 | Japan |

OTHER PUBLICATIONS

Communication from European Patent Office dated Sep. 22, 1997 in counterpart European Application No. 96307944.7 (3 pages).

*Primary Examiner*—P. Hampton-Hightower
*Attorney, Agent, or Firm*—Panitch Schwarze Jacobs & Nadel, P.C.

[57] ABSTRACT

A polyamide resin composition and a biaxially stretched film comprising the polyamide resin composition. The polyamide resin composition comprises (1) 93 to 99.5% by weight of a polyamide resin and (2) 0.5 to 7% by weight of an acid-modified resin, the acid-modified resin being obtained by adding 0.5 to 5 parts by weight of an unsaturated, carboxylic acid to 100 parts by weight of an ethylene-vinyl acetate copolymer having a vinyl acetate content of 20 to 50% by weight partially saponified to have a degree of saponification of 50 to 95 mol %.

5 Claims, No Drawings

POLYAMIDE RESIN COMPOSITION

FIELD OF THE INVENTION

This invention relates to a polyamide resin composition providing a polyamide film which retains excellent optical properties characteristic of polyamide resins and exhibits excellent pinhole resistance even at low temperatures.

BACKGROUND OF THE INVENTION

A polyamide resin film is excellent in various properties, such as gas barrier properties, toughness, pinhole resistance, heat resistance, optical characteristics, and oil resistance. Owing these characteristics, it has been used as a packaging film in a variety of fields, particularly in the field of food packaging, as a single-layer film, a base of a laminated film, or a lamina of a multi-layer film prepared by co-extrusion with other resins.

However, the pinhole resistance of a polyamide resin film, which is the most important for practical use, depends on temperature considerably. When a polyamide resin film is used at low temperatures, e.g., 5° C. or lower, pinholes tend to develop as a result of repeated flexing fatigue, leading to leakage of the contents or rotting of the food such as meat. Therefore, application to packaging of chilled beef or packaging of frozen food has been restricted.

In order to improve pinhole resistance at low temperatures, addition of polycaprolactone (as described in JP-B-6-62845, the term "JP-B" as used herein means an "examined published Japanese patent application"), a modified ethylene copolymer (as described in JP-B-7-15059) or an olefin ionomer (as described in JP-B-1-43624) has been proposed.

Under the present situation, however, these proposals fail to bring about sufficient improvement on resistance to pinhole due to repeated flexing at low temperatures, or cannot accomplish the improvement without impairing transparency and strength of the film.

SUMMARY OF THE INVENTION

An object of the present invention is to solve the above-described problem that the conventional polyamide films develop pinholes through repeated flexing fatigue at low temperatures and to provide a polyamide film which stands practical use.

Other objects and effects of the present invention will be apparent from the following description.

The inventors of the present invention have conducted extensive study, seeking a solution to the above-described problem of conventional polyamide films. As a result, they have found that the low-temperature pinhole resistance of a polyamide film can be improved while retaining the excellent optical characteristics of a polyamide resin by adding, to a polyamide resin, a specific amount of a specific acid-modified partial saponification product of an ethylene-vinyl acetate copolymer (hereinafter abbreviated as EVA) and also by specifying the thickness of the polyamide film.

The present invention relates to a polyamide resin composition comprising: (1) 93 to 99.5% by weight of a polyamide resin and (2) 0.5 to 7% by weight of an acid-modified resin, the acid-modified resin being obtained by adding 0.5 to 5 parts by weight of an unsaturated carboxylic acid to 100 parts by weight of an ethylene-vinyl acetate copolymer having a vinyl acetate content of 20 to 50% by weight partially saponified to have a degree of saponification of 50 to 95 mol %.

The present invention also relates to a biaxially stretched film comprising the above polyamide resin composition having a thickness of 3 to 40 μm.

DETAILED DESCRIPTION OF THE INVENTION

Examples of the polyamide resin used in the present invention includes polylactams, such as nylon 6, nylon 11, and nylon 12; polyamides obtained from dicarboxylic acids and diamines, such as nylon 66, nylon 610, and nylon 612; copolyamides, such as nylon 6/66, nylon 6/610, nylon 6/12, nylon 6/612, nylon 6/66/610, nylon 6/66/12, and nylon 6/6T (T: terephthalic acid component); and mixtures thereof. Among these, nylon 6 and nylon 6/66 are preferably used in the present invention. The molecular weight of the polyamide resin is preferably 15,000 to 30,000.

The acid-modified resin, i.e., the acid-modified partial saponification product of EVA (hereinafter referred to as HEVA-C) used in the present invention can be obtained as follows.

EVA, the starting material of the resin component, can be prepared by known processes, such as a high pressure process and an emulsion process. EVA having a vinyl acetate content of 20 to 50% by weight is usually used, and EVA having a vinyl acetate content of 30 to 45% by weight is preferred. If the vinyl acetate content is too small, crystallizability of polyethylene cannot be suppressed, resulting in poor transparency. As the vinyl acetate content increases, the resulting film becomes softer to manifest the effect of improving pinhole resistance. If the vinyl acetate content is too large, the resin becomes too soft, making saponification difficult.

Saponification of EVA can be carried out in a known manner, for example, by treating with a system comprising a low-boiling point alcohol (e.g., methanol or ethanol) and an alkali (e.g., sodium hydroxide, potassium hydroxide or sodium methylate) to obtain a partially saponified EVA having a degree of saponification of 50 to 95 mol % (hereinafter referred to as HEVA). If the degree of saponification is lower than 50 mol %, the resulting resin has insufficient compatibility with a polyamide resin, failing to improve transparency. If the degree of saponification exceeds 95 mol %, the resin has excessive crystallizability, failing to provide softness.

A method for obtaining a film having excellent gas barrier properties which comprises mixing a polyamide resin with a completely saponified ethylene-vinyl acetate copolymer (degree of saponification: 99% or more), i.e., ethylene-vinyl alcohol copolymer, is disclosed in many literatures, e.g., JP-B-44-24277, JP-B-48-22833, and JP-A-50-121347 (the term "JP-A" as used herein means an "unexamined published Japanese patent application). The resin compositions disclosed have high crystallizability and provide hard films. The copolymer of the present invention, on the other hand, is used in a partially saponified state to improve softness and thereby to improve pinhole resistance.

HEVA-C can be obtained from HEVA by making use of a grafting reaction or an esterification reaction. In the case of using a grafting reaction, HEVA is acid-modified with an unsaturated monocarboxylic acid (e.g., acrylic acid, methacrylic acid, crotonic acid or itaconic acid) or an unsaturated dicarboxylic acid (e.g., maleic acid) or an anhydride of these acids in the presence of a radical initiator, such as benzoyl peroxide, lauroyl peroxide, and α,α'-azobisisobutyronitrile, under such conditions that 0.5 to 5 parts by weight per 100 parts by weight of HEVA, of the unsaturated carboxylic acid may be added to HEVA.

In the case of using an esterification reaction, a dicarboxylic acid anhydride (e.g., maleic anhydride, succinic anhydride, phthalic anhydride or hexahydrophthalic anhydride) is added in such an amount that 5 to 60 mol %, preferably 10 to 50 mol %, of the hydroxyl groups of HEVA may be esterified.

The modification of HEVA to HEVA-C aims chiefly at rendering HEVA compatible with a polyamide resin. If the amount of the unsaturated carboxylic acid added is less than 0.5 part by weight, the transparency is not improved due to lack of compatibility. If it is more than 5 parts by weight, the resin composition undergoes gelation, making the resulting film commercially invaluable.

While a specifically limited modified polyolefin resin is essential to the present invention, not all the limitations need to be satisfied in practice for use in such fields that do not require transparency, for example, packaging of cheese or mat film type packaging.

HEVA-C is used in an amount of 0.5 to 7% by weight, preferably 1 to 5% by weight, based on the amount of the polyamide resin composition including the polyamide resin and HEVA-C. That is, the amount of the polyamide resin is 93 to 99.5% by weight, preferably 95 to 99% by weight, based on the amount of the polyamide resin composition. If HEVA-C added is less than 0.5% by weight, the effect on the pinhole resistance is insubstantial. If it exceeds 7% by weight, the transparency is deteriorated.

When HEVA-C is added to a polyamide resin, a commercially available compatibilizer for polymer alloys, such as ionomer resins and modified ethylene ethyl acrylate, can be added to further improve the transparency. The added amount of the compatibilizer is generally 5 to 30% by weight based on the amount of HEVA-C added.

A polyamide resin and HEVA-C can be mixed by dry blending, or a blend of a polyamide resin and HEVA-C can be melt-kneaded in an extruder and pelletized.

The resin composition of the present invention can be generally used in the form of a film, particularly a stretched film, which can be produced in a known manner. For example, the resin composition is melt-kneaded in an extruder, extruded through a T-die or a coat hanger die into flat film, and cooled by casting on a roll (casting method), or extruded through a circular die into tubular film, and cooled with water (tubular method).

The flat or tubular film can be stretched on the same or separate line. For example, successive biaxial stretching of the film is carried out by stretching a flat film at a stretch ratio of 2 to 4 by means of a roll type longitudinal stretching machine and then stretching laterally at a stretch ratio of 2 to 5 by means of a tenter. If desired, the biaxially stretched film is heat-treated and wound up while cooling gradually. The resulting biaxially stretched film has a thickness of 3 to 40 μm, preferably 5 to 25 μm.

The pinhole resistance as referred to in the invention has thickness dependence and becomes worse with an increase in thickness. If the film thickness exceeds 40 μm, addition of HEVA-C brings about no substantial improvement on pinhole resistance. If the thickness is smaller than 3 μm, the film loses the strength retaining function characteristic of a polyamide resin.

A biaxially stretched polyamide film can be prepared by not only the above-illustrated successive biaxial stretching using a tenter but also simultaneous biaxial stretching using a tenter or stretching of a tubular film.

The polyamide resin composition of the invention can contain other additives according to the desired characteristics, such as heat stabilizers, weathering agents inclusive of ultraviolet absorbers, flame retardants, antistatics, lubricants, nucleating agents, plasticizers, blowing agents, colorants, stabilizers, and coupling agents.

The film comprising the resin composition of the present invention can be combined with films made of other polymers to form a laminated film. The method for laminating the films is not limited. For example, the polyamide film of the invention and one or more other polymer films are adhered with an adhesive, or the polyamide resin composition of the invention is co-extruded with other resins to obtain a multi-layer film. In particular, a multi-layer film obtained by co-extrusion with a saponified ethylene-vinyl acetate copolymer resin has improved interlaminar adhesion.

The present invention will now be illustrated in greater detail by way of Examples and Comparative Examples, but the present invention is not construed as being limited thereto.

Measurement and evaluation of physical properties of the films prepared were made as follows.

(1) Transparency

The haze of a film was measured with a direct-reading haze meter (manufactured by Suga Sikenki K.K.) in accordance with ASTM D-1003. A haze of 6 or smaller was taken as an indication of the effect on improvement of transparency.

(2) Pinhole Resistance

A film was flex-tested by giving 200 flexings at −20° C. by means of a Gelbo Flex Tester equipped with a thermostat (manufactured by Rigaku Kogyo K.K.) in accordance with MIL-B-131C. The number of pinholes developed was counted with a pinhole detector (manufactured by Sanko Denshi K.K.). Development of 5 or less pinholes was judged as an indication of the effect on improvement of pinhole resistance.

Modified polyolefin resin a (HEVA-C) shown in Table 1 below was prepared as follows.

In a 20 stainless steel reactor equipped with a stirrer, a condenser, a thermometer, and a tube for introducing nitrogen were charged 5 of industrial xylene and 2 kg of EVA produced by a high pressure process having a melt index of 65 g/10 min (measured according to ASTM 1238-65T) and a vinyl acetate content of 40% by weight. The mixture was heated to an inner temperature of 40° to 50° C. to form a uniform solution. To the solution were added 540 g of methanol and 84 g of a previously prepared 24% methanolic solution of sodium methoxide, and the mixture was allowed to react at 45° to 55° C. for 60 minutes while stirring. Fifty grams of water were then added to the reaction system to completely stop the saponification reaction. The degree of saponification of the resulting saponification product was found to be approximately 90%.

The inner temperature of the reaction system was raised up to 120° C. in a nitrogen stream while evaporating low-boiling point components. To the reaction mixture were added 40 g of acrylic acid and 2 g of benzoyl peroxide, followed by stirring at 120° C. for 30 minutes with stirring to carry out graft reaction to modify the saponification product with the acid. Subsequently, the resulting viscous reaction mixture was transferred to a 20 Henschel mixer equipped with a condenser, a tube for introducing nitrogen, and a thermometer while pressing nitrogen into the mixer. After the inner temperature was lowered to 100° C., 12 of water warmed at 80° C. was added thereto. The mixture was heated while stirring at 510 rpm thereby to evaporate xylene as an azeotrope with water until the residual xylene content in the system was reduced to 60 parts by weight per 100 parts by weight of the solids content. The system had been emulsified at the end of xylene evaporation.

The resulting emulsion was stirred at 510 rpm while cooling with cold water circulating in the jacket of the Henschel mixer, to obtain granules having an average particle diameter of 2 mm. The granules were separated by centrifugation and dried under vacuum at 50° C. for 4 hours to obtain 1648 g of modified polyolefin resin a (acid-modified resin of a partially saponified ethylene-vinyl acetate copolymer), the properties of which are shown in Table 1 below.

HEVA-C b to e having the properties shown in Table 1 were produced in the same manner as in the preparation of HEVA-C a.

EXAMPLE 1

A polyamide 6 resin (UBE Nylon 1022B produced by Ube Industries, Ltd.; relative viscosity: 3.5) was used as a base resin. A mixture consisting of 95 wt % of the base resin and 5 wt % of HEVA-C a of Table 1 was melt-kneaded, extruded into film, and biaxially stretched using the following equipment under the following conditions. The physical properties of the resulting biaxially stretched film were evaluated according to the methods described above. The results obtained are shown in Table 2.

Casting Film (1) Apparatus: T-die extruder (diameter: 40 mm), manufactured by Plastic Kogaku Kenkyusho.

(2) Film thickness: 100 μm (3) Processing conditions:
$C_1$ ... 230° C.
$C_2$ ... 240° C.
$C_3$ ... 250° C.
$C_4$ ... 250° C.
AD ... 250° C.
D ... 250° C.

(4) Roll temperature: 30° C.

Biaxial Stretching (1) Stretching apparatus: Biaxial stretching machine manufactured by Iwamoto Seisakusho.

(2) Stretch ratio: 2.6 in longitudinal direction; 2.6 in lateral direction; 6.8 in total (simultaneous stretching)

(3) Stretching temperature: 70° C.

(4) Film thickness: 15 μm

EXAMPLE 2

A biaxially stretched film having a thickness of 15 μm was prepared in the same manner as in Example 1, except for using a resin composition prepared by melt kneading 99 wt % of the base resin and 1 wt % of HEVA-C a of Table 1.

EXAMPLE 3

A biaxially stretched film having a thickness of 15 μm was prepared in the same manner as in Example 1, except for using a resin composition prepared by melt kneading 93 wt % of the base resin and 7 wt % of HEVA-C a of Table 1.

EXAMPLE 4

A biaxially stretched film having a thickness of 15 μm was prepared in the same manner as in Example 1, except for using a resin composition prepared by melt kneading 95 wt % of the base resin and 5 wt % of HEVA-C b of Table 1.

EXAMPLE 5

A biaxially stretched film having a thickness of 15 μm was prepared in the same manner as in Example 1, except for using a resin composition prepared by melt kneading 95 wt % of the base resin and 5 wt % of HEVA-C c of Table 1.

COMPARATIVE EXAMPLE 1

A biaxially stretched film having a thickness of 15 μm was prepared in the same manner as in Example 1, except for using a resin composition prepared by melt kneading 99.7 wt % of the base resin and 0.3 wt % of HEVA-C a of Table 1.

COMPARATIVE EXAMPLE 2

A biaxially stretched film having a thickness of 15 μm was prepared in the same manner as in Example 1, except for using a resin composition prepared by melt kneading 90 wt % of the base resin and 10 wt % of HEVA-C a of Table 1.

COMPARATIVE EXAMPLE 3

A biaxially stretched film having a thickness of 15 μm was prepared in the same manner as in Example 1, except for using a resin composition prepared by melt kneading 95 wt % of the base resin and 5 wt % of HEVA-C d of Table 1.

COMPARATIVE EXAMPLE 4

An extruded film (unstretched) was prepared in the same manner as in Example 1, except for using a resin composition prepared by melt kneading 95 wt % of the base resin and 5 wt % of HEVA-C e of Table 1. Because the extruded film suffered considerable gelation, no evaluation was made.

COMPARATIVE EXAMPLE 5

A biaxially stretched film having a thickness of 15 μm was prepared in the same manner as in Example 1, except for using the base resin alone.

TABLE 1

| HEVA-C | Ethylene Content (wt %) | Vinyl Acetate Content (wt %) | Degree of Saponification (mol %) | Amount of Acid Added (wt %) |
|---|---|---|---|---|
| a | 60 | 40 | 90 | 2 |
| b | 70 | 30 | 60 | 2 |
| c | 70 | 30 | 90 | 2 |
| d | 85 | 15 | 60 | 2 |
| e | 70 | 30 | 30 | 2 |

TABLE 2

| Example No. | Polyamide Resin Composition Poly-amide (wt %) | HEVA-C Kind | HEVA-C Amount (wt %) | Number of Pinholes (−20°C., 200 flexings) | Trans-parency (Haze) (%) |
|---|---|---|---|---|---|
| Example 1 | 95 | a | 5 | 2 | 3.6 |
| Example 2 | 99 | a | 1 | 4 | 3.0 |
| Example 3 | 93 | a | 7 | 1 | 5.4 |
| Example 4 | 95 | b | 5 | 4 | 5.0 |
| Example 5 | 95 | c | 5 | 3 | 3.9 |
| Comparative Example 1 | 99.7 | a | 0.3 | 8 | 2.9 |
| Comparative | 90 | a | 10 | 1 | 9.4 |

TABLE 2-continued

| Example No. | Polyamide Resin Composition | | | Number of Pinholes (−20°C., 200 flexings) | Transparency (Haze) (%) |
|---|---|---|---|---|---|
| | Polyamide (wt %) | HEVA-C Kind | HEVA-C Amount (wt %) | | |
| Example 2 Comparative Example 3 | 95 | d | 5 | 10 | 11.6 |
| Comparative Example 4 | 95 | e | 5 | considerable gelation | — |
| Comparative Example 5 | 100 | — | — | 15 | 2.5 |

The resin compositions of Examples 1 through 3 contain HEVA-C of the best mode in a proportion varying within the scope of the invention. The films of these resin compositions exhibit improved pinhole resistance while retaining the transparency essential to a polyamide film. The resin compositions of Examples 4 and 5 contain HEVA-C having a varied vinyl acetate content and a varied degree of saponification within the scope of the invention. The films of these resin compositions similarly exhibit improved pinhole resistance without impairing the transparency.

In Comparative Examples 1 and 2, although HEVA-C of the best mode is used, the amount added is out of the scope of the invention. At too small an amount, the film has poor pinhole resistance. At too large an amount, the transparency is reduced. In Comparative Example 3, the resin film is inferior in both transparency and pinhole resistance because of such a low vinyl acetate content as 15% by weight. In Comparative Example 4, the HEVA-C having a degree of saponification as low as 30 mol % has poor compatibility with the polyamide base resin. As a result, considerable gelation occurred during film extrusion. Solely comprising a polyamide resin, the film of Comparative Example 5 is, though excellent in transparency, inferior in pinhole resistance.

As demonstrated above, by adding an acid modified resin of a partially saponified ethylene-vinyl acetate copolymer to a polyamide resin, the pinhole resistance at low temperatures is improved without impairing the transparency essential to a polyamide film. Thus, the present invention appreciably broadens the range of application of a polyamide film, which has been limited due to poor low-temperature pinhole resistance, thereby making it possible to apply a polyamide film at low temperatures as in packaging of chilled beef, packaging of frozen food, and the like.

While the invention has been described in detail and with reference to specific examples thereof, it will be apparent to one skilled in the art that various changes and modifications can be made therein without departing from the spirit and scope thereof.

What is claimed is:

1. A polyamide resin composition comprising:

(1) 93 to 99.5% by weight of a polyamide resin and (2) 0.5 to 7% by weight of an unsaturated carboxylic acid added resin, said unsaturated carboxylic acid added resin being produced from the addition of 0.5 to 5 parts by weight of an unsaturated carboxylic acid to 100 parts by weight of an ethylene-vinyl acetate copolymer having a vinyl acetate content of 20 to 50% by weight partially saponified to have a degree of saponification of 50 to 95 mol %.

2. A polyamide resin composition as claimed in claim 1, wherein said polyamide resin composition comprises 95 to 99% by weight of said polyamide resin (1) and 1 to 5% by weight of said unsaturated carboxylic acid added resin (2).

3. A polyamide resin composition as claimed in claim 1, wherein said ethylene-vinyl acetate copolymer has a vinyl acetate content of 30 to 45% by weight.

4. A biaxially stretched film comprising a polyamide resin composition comprising:

(1) 93 to 99.5% by weight of a polyamide resin and (2) 0.5 to 7% by weight of an unsaturated carboxylic acid added resin, said unsaturated carboxylic acid added resin being produced from the addition of 0.5 to 5 parts by weight of an unsaturated carboxylic acid to 100 parts by weight of an ethylene-vinyl acetate copolymer having a vinyl acetate content of 20 to 50% by weight partially saponified to have a degree of saponification of 50 to 95 mol %, said biaxially stretched film having a thickness of 3 to 40 μm.

5. A biaxially stretched film as claimed in claim 4, wherein said film has a thickness of 5 to 25 μm.

* * * * *